Nov. 3, 1942.   J. BERGER ET AL   2,300,483
PIPE UNION
Filed Jan. 18, 1940
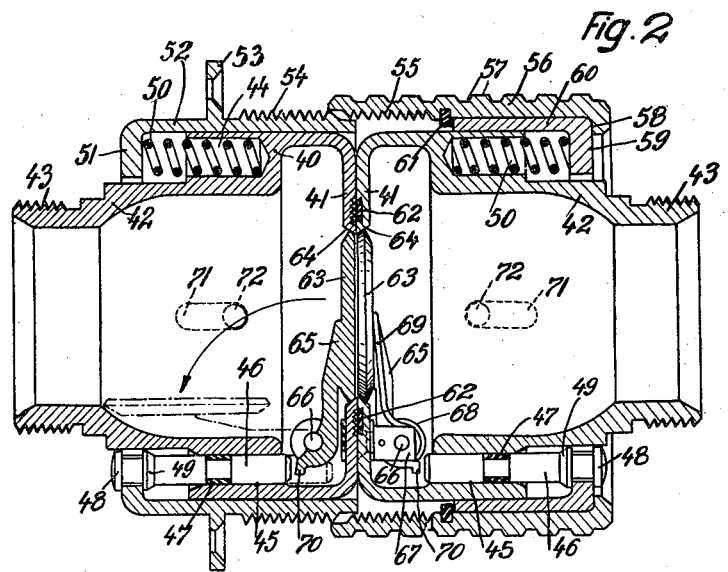
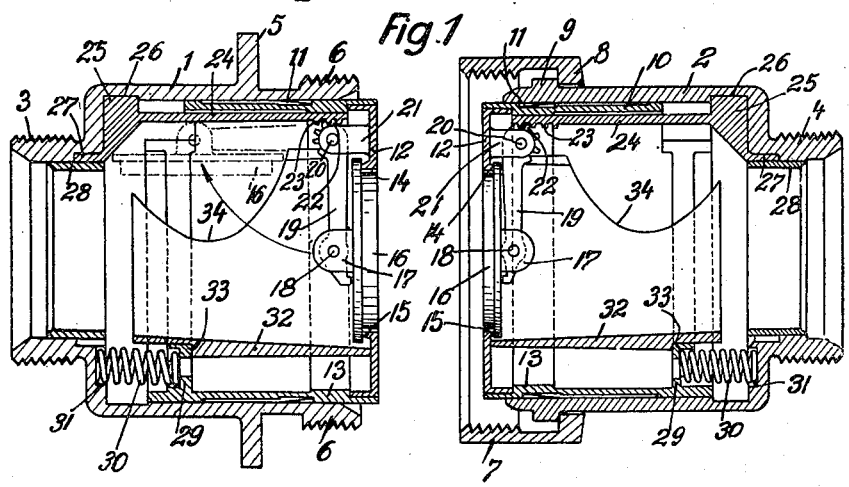
Inventors
J. Berger, R. Hundt
R. Kaiser, H. Klaue
E. Tatschke, W. Zurmühlen
By   E. A. Venn.
Agent.

Patented Nov. 3, 1942

2,300,483

UNITED STATES PATENT OFFICE 2,300,483

PIPE UNION

Julius Berger, Berlin-Wilhelmsruh, Rudolf Hundt, Berlin-Neukolln, Rudolf Kaiser, Hohen-Neuendorf, near Berlin, Hermann Klaue, Berlin-Frohnau, Eduard Tatschke, Berlin, and Willy Zurmühlen, Wandlitz, near Berlin, Germany, assignors to Michigan Patents Corporation, Jackson, Mich.

Application January 18, 1940, Serial No. 314,398
In Germany May 15, 1939

4 Claims. (Cl. 284—18)

The present invention relates to pipe couplings of the type wherein shut-off valves are mounted in the two coupling members, the valves being kept open when the coupling is closed and closed when the coupling members are separated.

In pipe couplings, more particularly those for pipes for hydraulic controlling fluid, it is particularly important that when separating the coupling members no losses of hydraulic liquid should occur, and that when assembling the coupling members there should be no admission of air into the coupling, and therefore into the pipes united thereby. Any air that might get in would make the controlling operation by means of the hydraulic fluid practically impossible, since the air, as distinct from the hydraulic medium, is highly compressible, and consequently the pressure conditions and the movement of the liquid in the control pipes would be fundamentally and always disadvantageously altered. Furthermore, it is very important in pipe coupling that are intended more particularly for pipes carrying hydraulic liquid that the valve closure bodies, when they are in their open positions, should not obstruct to any appreciable extent the cross-sectional area provided for the passage of the flowing liquid.

We have found that all these important conditions can be fulfilled in a simple manner, at the same time providing great advantages in structure and manipulation, if the two valve closure bodies, when the two coupling members are united, bear directly upon each other before the beginning of the opening movement, in the line separating the two coupling members, and if recesses are provided in the two coupling members, laterally of the cross-sectional areas of flow into which the valve closure bodies recede when completely opened.

We have further found that particularly simple and reliable couplings are obtained if the valve closure bodies are moved into the lateral recesses by the coupling pressure. In order to carry out these movements suitable levers may advantageously be employed in flap valves. The couplings are preferably equipped with a single member, preferably operable by hand, and known in itself, which may be employed both for tightening and releasing the coupling and also for opening and closing the two valves. Screw caps known per se may e. g. be used as a single actuating member, the screw caps embracing the coupling bodies.

Particularly advantageous embodiments of the pipe coupling are furthermore obtained according to the invention if each valve is constructed and arranged as a complete and independent unit, and more particularly if each valve can be opened and closed independently of the parts of the other valve.

Springs may be provided for automatically returning the valve bodies into their closed positions.

Further features and details of the present invention will be evident from the following description of embodiments of the coupling, which are diagrammatically illustrated in the accompanying drawing, in which Fig. 1 is a longitudinal section of one form of construction, in which the valve closure bodies are constructed in a known manner as flaps, and a screw cap is provided for tightening and releasing the coupling, the two coupling members being represented spaced from each other; and Fig. 2 is a longitudinal section of another form of construction, in which the coupling members abut against each other, the valve closure bodies being in their closed position, and a screw cap being provided for tightening and releasing the coupling and at the same time for actuating the valves.

In the embodiment illustrated in Fig. 1, two muff-shaped coupling sleeves 1 and 2 are provided, which can be drawn together and released again by means of a screw cap to be hereinafter described. Coupling body 1 is equipped, at the end remote from the plane of separation, with a screw-threaded tubular member 3, which can be connected in the usual manner with a pipe line, a hosepipe or the like. The coupling body 2 is correspondingly provided with a screw-threaded tubular member 4. Coupling body 1 has a flange 5, by means of which sleeve 1 can be secured by means of screws or the like.

At the end adjacent to the plane of separation the coupling body 1 has an externally screw-threaded tubular projection 6. This external screw-thread is designed to cooperate with the corresponding internal screw-thread of screw cap 7, which surrounds the other coupling body 2, and is equipped with a rear abutment 8, which can cooperate with an abutment 9, which may be a flange on the coupling body 2, for the purpose of moving the coupling body 2 towards the coupling body 1 when screwing screw cap 7 on to screw thread 6, and of pressing them firmly together after bringing them into contact. The diameter of flange or abutment 9 is so dimensioned that the screw cap 7 can be withdrawn backwards over the coupling body 2.

In the interior of the coupling bodies 1 and 2 are provided the closure valves and their actuating members and returning elements, which, in the constructional form illustrated, are similar in form, that is to say, as represented in section, they may be mirror images of each other.

In particular, within each of the coupling bodies 1 and 2, there is a sleeve 10, which is displaceable in the coupling bodies, an annular packing 11 being provided in each of the sleeves 1 and 2 for sealing purposes, packing 12 being located in a groove in sleeve 10, and sliding along the internal surface of the coupling body.

Sleeve 10 is equipped at the plane of separation of the coupling with a bottom 12 arranged at right angles with regard to sleeve 10 and forming with it a shell or cup. Bottom 12 may be separately inserted, and bears against an internal annular bead 13 in sleeve 10. Bottom 12 is provided with a valve passage aperture 14, which, when the valve is closed, is covered by the valve closure body. Bottom 12 is provided at the passage aperture 14 with a collar 15 forming a valve seat, upon which may bear a rim projecting beyond the remainder of the valve closure body 16. Bearing 17 for a joint pin 18 is provided on the side of the valve closure body 16 facing the interior of the coupling. Arm 19 is rotatable about joint pin 18, while the other end of arm 19 can be rocked about a further joint 20, and is here equipped with a toothed segment 22. Joint 20 is supported in bearing piece 21 which is secured to bottom 12 of sleeve 10 slidable in coupling body 1 or 2 as the case may be.

Rack 23 meshes with toothed segment 22. Rack 23 is mounted on abutment body 24, which bears against the coupling body 1 or 2, and is supported therein in a fixed position. Abutment 24 has a rearward projection 25 bearing against the coupling body and engaging in groove 26 in the coupling body. For further protection bearing 24, 25 terminates in an extension 27, which likewise engages in a recess in the coupling body 1 or 2. Sleeve 28 overlaps extension 27 in an inward direction. Sleeve 28 may be inserted by pressing it into the rear portion of each coupling body.

Abutment 24 preferably bears against sleeve 10 through the medium of a separate slipping surface, the arrangement being such that sleeve 10 is longitudinally slidable between abutment 24 and the adjacent wall of the coupling body.

Sleeve 10 is provided at its rear end, that is to say, at the end remote from the plane of separation of the coupling, with a projection 29, which forms a support and abutment for helical spring 30, the other end of which is supported in recess 31 in coupling body 1 or 2. Helical spring 30 bears against the coupling body and thus tends to press sleeve 10 out of coupling body 1 or 2.

A further sleeve 32 is arranged between bottom 12 of sleeve 10 and its rearward extension 29. Sleeve 32 serves for the passage, with as little hindrance as possible, of the flowing medium, for instance oil under pressure. The internal diameter of sleeve 32 corresponds to the internal diameters of the valve passage aperture and of the coupling body extension 3 and 4, respectively. Sleeve 32 is engaged by recess 33 on extension 29 of sleeve 10, and also comprises a hollow 34, which is provided where the valve closure body in its open position is located.

The coupling operates in the following manner. When the two coupling members are completely separated from each other, spring 30 presses sleeve 10 towards the plane of separation of the coupling so far that the sleeve projects a definite distance outwards at the plane of separation in relation to the coupling body. This outward movement of sleeve 10 is limited because the sleeve is permanently coupled by means of bearing piece 21, joint pin 20 and toothed segment 22, by way of rack 23, with abutment 24, which is so clamped in the coupling body 1 as to be axially undisplaceable. If the valve closure body is now located in the closure position, a further rolling of toothed segment 22 along the rack 23 is not possible. Consequently a further forward movement of sleeve 10 out of its associated coupling body is prevented.

If the two coupling bodies are now brought together, first of all bottoms 12 of sleeves 10, as well as valve closure bodies 16, come into surface contact with each other. Consequently an escape of the medium flowing through, and an undesired admission of air, is not possible during the following coupling operations. After sleeves 10 of coupling bodies 1 and 2 have been brought into surface contact, screw cap 7 is screwed on to thread 6 of coupling body 1. Consequently the coupling bodies 1 and 2 are brought nearer together, since sleeves 10 can be displaced backwards into their coupling bodies, against the action of springs 30. At the same time, owing to the toothed gears 22 and 23, closure flaps 16 of the valves are rocked into their open position, until, with the coupling completely closed, they are located in their open positions, in which they offer no resistance at all to the medium flowing through. This position is indicated in dot-and-dash lines in Fig. 1.

In releasing the coupling the reverse procedure is adopted. Screw cap 7 is screwed down from thread 6, coupling bodies 1 and 2 moving asunder under the action of springs 30. At the same time the valve flaps are moved back again into their closure positions owing to the positively acting gear teeth 22 and 23. Only when these positions are reached is a complete release of the coupling and separation of the coupling bodies 1 and 2 possible, as the latter until then were still held together by screw cap 7.

In the embodiment illustrated in Fig. 2, two coupling bodies or sleeves 42 are provided, which may be identical in construction, and which are provided, at their opposite ends with screw-threaded extensions 43. Coupling bodies 42 flare out, in the direction towards the plane of separation of the coupling, to form a member 40, which has, at the plane of separation of the coupling, inwardly directed projections 41. Projections 41 form annular bodies, the remaining aperture being at the same time the passage aperture of the particular valve. Coupling bodies 41, 42 and 43 abut against each other in the closed condition with the front external surfaces of the parts 41.

In each of the coupling bodies there are also provided a cavity 44 for the accommodation of a helical spring and a cavity 45 for the accommodation of a sliding bolt or plunger 46. Plunger 46 slides in bore 45 parallel to the axis of the pipe coupling. Packing 47 is provided round a constricted portion of bolt 46, and seals the bolt guide from the exterior and from the interior. Bolt 46 is supported by its head 48 in inwardly directed collar 51 on sleeve 52 which surrounds the coupling bodies. To secure bolt 46 in collar 51 the bolt is provided with a girdle 49 or the like, which prevents axial displacement of the bolt in the bearing bore of collar 51. Upon relative displacement of the coupling body and of sleeve 52 embracing the latter bolt 46 is moved axially to and fro in its guide 45 in the coupling body. Bolt 46 cooperates in a manner to be hereinafter described with a cam for actuating the flap valve.

The helical spring provided in cavity 44 of the coupling body is designated 50. Spring 50 bears at one end against the coupling body and at the other end against collar 51. Spring 50 tends to move the coupling body away from its surrounding sleeve 52 integral with collar 51 in such a way that the two coupling bodies are pressed against each other.

Sleeve 52 is provided with a fastening flange 53 and an external screw thread 54. Screw thread 54 cooperates with internal screw thread 55 in screw cap 56 provided externally with grooves or ribs 57 to facilitate manipulation. Screw cap 56 has at the end remote from internal thread 55 an inwardly directed abutment 58, which can cooperate with a correspondingly directed collar 59 on sleeve 60. Packing or buffer 61 is located in a groove in screw cap 56 in front of the end face of sleeve 60 facing the plane of separation of the coupling. Further packings on the contact surfaces of collars 41 of the coupling bodies are denoted by 62.

The inner margins of collars 41 are constructed as seats 64 for valve flaps 63, which have on one side a thickened portion 65, which continues into an extension as far as cam 70. The extension of the thickened portion 65 forms at one place a rotational bearing for flap 63. The rotation is effected about bolt 66 secured to coupling body 42 or 40 by means of bearing 67. Helical torsion spring 68 is preferably arranged round rotational bolt 66 and bears with one end 69 against valve flap 63, and with the other end on the rotary bearing in such a way that it constantly tends to force valve flap 63 into its closure position.

Cam 70 cooperates with plunger 46 for transmitting the opening force to the valve flap.

Finally, 71 and 72 denote respectively a slot and a bolt which are provided on the coupling bodies 42 and on the sleeves 52 or 60 surrounding them respectively, and ensure a limited purely axial displacement of the respective coupling members.

The coupling operates in the following manner. With the coupling bodies or halves separated, springs 50 force coupling bodies 42 in the direction of the plane of separation of the coupling, abutment pins 72 fixing their limiting positions. Moreover torsion springs 68, 69 force valve plates 63 on to their seats 64, since actuating plungers 46 do not press upon cams 70, this position being shown in Fig. 2.

If screw cap 56 is now screwed along thread 54 sleeves 52 and 60 are positively moved relatively to each other, since thread 54 is rigidly connected with sleeve 52, and abutment 58 presses against collar 59 of sleeve 60 and takes the latter along. During the movement of sleeves 52 and 60 towards each other, on the one hand recoil springs 50 are compressed and stressed, and on the other hand plunger 46, which is undisplaceably mounted on the sleeve 52, is pushed more and more through its guide 45 and against cam 70 of valve plate 63, until it touches cam 70. Finally, plunger 46 forces cam 70 to rotate about bolt 66, valve flap 63 being moved into its open position against the action of torsion spring 68, 69.

With the coupling completely tightened, valve plate 63 assumes the position illustrated in dot-and-dash lines in Fig. 2.

Upon releasing the coupling by unscrewing screw cap 50 sleeves 52 and 60 that have been brought together, are moved away from their coupling bodies under the action of springs 50. Furthermore, valve flaps 63 are moved more and more into their closure positions under the action of torsion springs 68, 69, the particular operative position being initially determined by plungers 46. Upon the closure position being reached, plungers 46 are moved away from cams 70 so that they no longer have any influence upon the movability of the valve flaps.

After completely unscrewing the screw cap from thread 54, the coupling members can be separated, since the passage apertures of the valves have already been completely shut off.

Various changes and modifications may be made to the details of construction of the invention without departing from the broader spirit and scope thereof as set forth in the following claims.

What we claim is:

1. A pipe coupling comprising two muff-shaped coupling members, each comprising a slide body slidable axially with regard to the coupling member, a valve seat, a valve closure flap pivoted to said slide body, a spring urging the slide body to protrude axially from the coupling member beyond the line of separation of the coupling members, a control means fitted to the coupling member, and engaging means connected with the valve closure body and cooperating with said control means, said cooperating control means and engaging means causing the valve closure bodies to rock into their open position when the slide bodies are pushed into the coupling members by pressing them against each other against the action of said springs, and to rock back into the closed position when the coupling members are allowed to move as under the action of said springs.

2. A pipe coupling consisting of two muff-shaped coupling members, each of said coupling members comprising a cup-shaped slide body having a bottom portion slidable axially with regard to the coupling member, the bottom portion of said two cup-shaped slide bodies facing each other and abutting against each other when the coupling members are engaged, each of said bottom portions being formed with a passage aperture, the edge thereof forming a valve seat, each coupling member further comprising a valve closure flap pivoted to said slide body, a compression spring bearing at one end against the coupling member and at the other end against the slide body and urging the slide body to protrude axially from the coupling member beyond the line of separation of the coupling members, a control means fitted to the coupling member, and engaging means connected with the valve closure body and cooperating with said control means, said cooperating control means and engaging means causing the valve closure bodies to rock into their open position when the slide bodies are pushed into the coupling members by pressing them against each other against the action of said springs, and to rock back into their closed position when the coupling members are allowed to move asunder under the action of said springs, and a recess in each of said coupling members adapted to house said valve closure body when in its open position, whereby the united coupling provides a substantially uninterrupted liquid passage therethrough.

3. A pipe coupling consisting of two muff-shaped coupling members, each of said coupling members comprising a bottom portion, a slide body slidable axially over the coupling member, the bottom portion of the two coupling members facing each other and abutting on each other when the coupling is engaged, each of said bottom portions being formed with a passage aperture, the edge thereof constituting a valve seat, each coupling member further comprising a valve closure flap pivoted to the coupling member, a compression spring bearing at one end against the coupling member and at the other end against the slide body and urging the slide body to protrude axially from the coupling member, a plunger secured to the slide body and slidable in the coupling member, a cam connected with the valve closure flap and cooperating with said plunger, said plunger and said cam causing each of said valve closure flaps to rock into their open position when the slide bodies are pushed into the coupling members against the action of said spring, and further springs for returning the slide body and the valve closure flap into their closed positions when the coupling members move asunder.

4. A pipe coupling consisting of two muff-shaped coupling members, each comprising a slide body slidable axially in the interior of the coupling member and provided with a bottom portion, the bottom portion of the two slide bodies facing each other and abutting on each other when the coupling members are engaged, each of said bottom portions being formed with a passage aperture, the edge thereof forming a valve seat, a rocking arm pivotally mounted on the slide body, said valve closure body being mounted on the free end of said rocking arm, a compression spring bearing at one end against the coupling member and at the other end against the slide body and urging the slide body to protrude axially from the coupling member beyond the line of separation of the coupling members, a toothed rack secured to the coupling member, a toothed segment extending under an angle of about 90 degrees, rigidly connected with said rocking arm, concentric with its pivot and meshing with said rack, said toothed rack and said segment causing the valve closure bodies to rock into their open position when the slide bodies are pushed into the coupling members by pressing them against each other against the action of said springs, and to rock back into their closed position when the coupling members are allowed to move asunder under the action of said springs.

JULIUS BERGER.
RUDOLF HUNDT.
RUDOLF KAISER.
HERMANN KLAUE.
EDUARD TATSCHKE.
WILLY ZURMÜHLEN.